Sept. 15, 1931.  C. C. FUERST  1,823,266
CAMERA CONSTRUCTION
Filed July 12, 1930   2 Sheets-Sheet 1
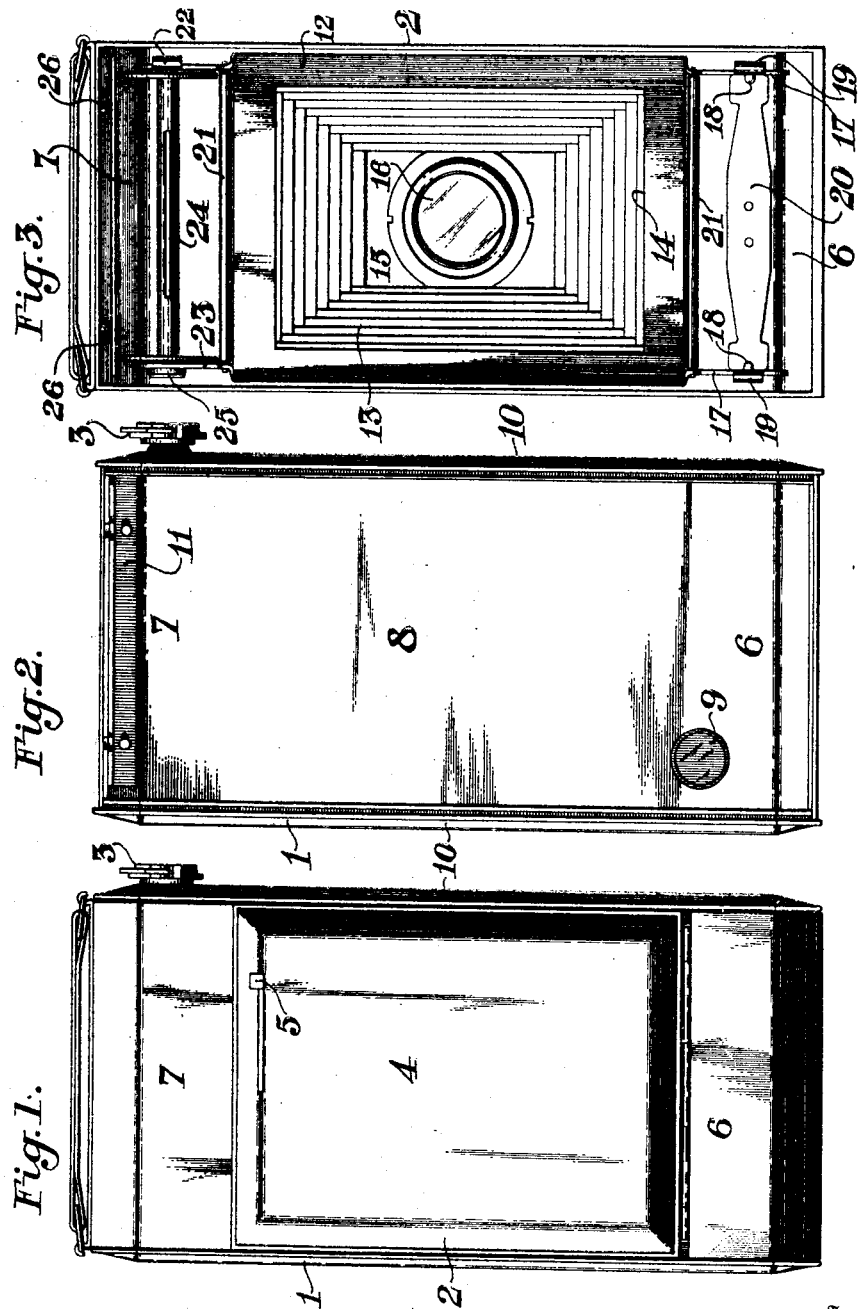
Inventor,
Carl C. Fuerst,
By Newton M Perrins
Donald H. Stewart
Attorneys Sept. 15, 1931.                C. C. FUERST                1,823,266
                          CAMERA CONSTRUCTION
                          Filed July 12, 1930          2 Sheets-Sheet 2
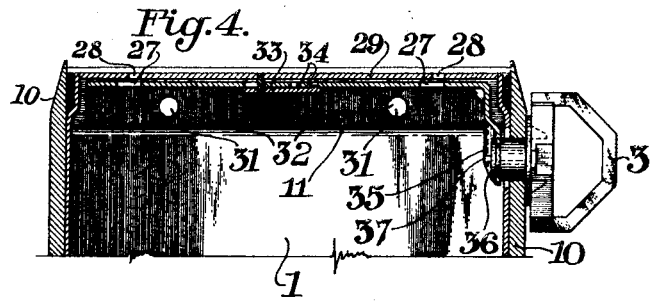
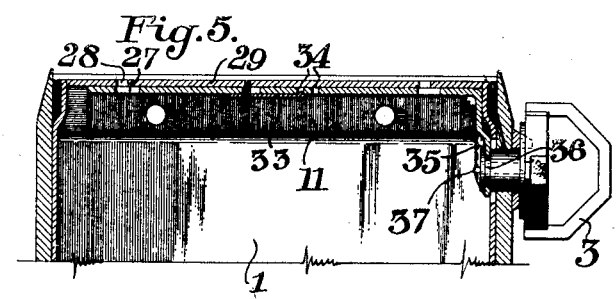
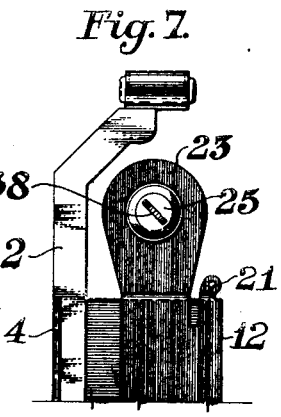
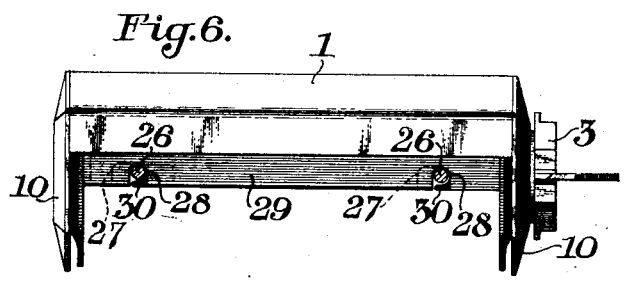
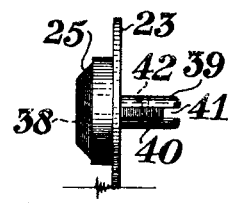
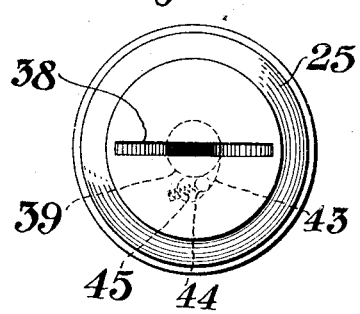
Carl C. Fuerst,
Inventor, Patented Sept. 15, 1931

1,823,266

UNITED STATES PATENT OFFICE

CARL C. FUERST, OF ROCHESTER, NEW YORK, ASSIGNOR TO EASTMAN KODAK COMPANY, OF ROCHESTER, NEW YORK, A CORPORATION OF NEW YORK

CAMERA CONSTRUCTION

Application filed July 12, 1930. Serial No. 467,448.

My present invention relates to photography, and more particularly to photographic roll holding cameras. It is directed particularly to roll holding cameras in which a body portion comprising the bellows frame, bellows front, and spool holders for feed and winding spools, on one hand, and a back or shell on the other, are separated from each other for the purpose of gaining access to the focal plane of the film chamber.

The invention has for its object to provide a simple and convenient device for locking the said parts together.

Another object of the invention is to combine the locking mechanism and the film winding mechanism into one unit.

To these and other ends the invention resides in certain improvements and combination of parts, all as will be hereinafter more fully described, the novel features being pointed out in the claims at the end of the specification.

The drawings, wherein like reference characters designate like parts throughout:

Figure 1 is a front elevation of a folding roll holding camera;

Figure 2 is a front elevation of the back or shell of said camera constructed in accordance with and illustrating one embodiment of my invention;

Figure 3 is a rear elevation of the camera body detached from the back or shell which illustrates another embodiment of my invention;

Figure 4 is a fragmentary enlarged sectional view taken axially through the winding mechanism of the camera back or shell;

Figure 5 is a similar view to Figure 4 showing the part in another position;

Figure 6 is an end view of the back or shell with the locking pins shown in cross section;

Figure 7 is a fragmentary enlarged side elevation of the body portion of the camera;

Figure 8 is a fragmentary rear elevation of the winding mechanism of the body portion of the camera;

Figure 9 is an enlarged side elevation of the winding mechanism of the body showing a one way clutch in broken lines.

The present invention is, in reality, an improvement over the winding mechanism and locking device shown and described in the patent to Kroedel No. 1,303,918, patented May 20, 1919. This patent describes a combined film winding and camera locking mechanism whereby, to accomplish its purpose, the film spool is required to be moved axially. My invention, however, has the advantage of having a positive connection between the locking mechanism and the winding key and does not require the axial movement of the film spool or movement of the film.

The camera illustrating the present embodiment comprises two major separable parts, an outer shell 1, which I term the back, and is shown detached in Figure 2, and an inner member 2, which I term the body, and is shown detached in Figure 3.

The outer shell 1 is provided with a winding key 3, and the body 2 with a hinged bed plate 4 which is secured in a closed position by the latch 5, the two members when joined together forming film spool compartments 6 and 7 at each end of the camera, separated by the exposure frame. The back 1 comprises a back wall 8, which is provided with the usual red window 9 to permit the reading of the exposure numbers upon the backing paper of the film, the two side walls 10, and a sliding latching device 11 which is directly connected to the winding key 3, as will be pointed out later in the specification. The body 2 comprises an exposure frame 12 to which the rear end of the bellows 13 is attached, and the frame 12 forms the exposure opening 14 of the camera. The front end of the bellows 13 is attached to the lens board 15 which supports the lens 16.

On the lower side of the frame 12 are a pair of opposed spring ears 17 carrying centers 18, upon which the film spool of the supply cartridge may be mounted. The rounded over lugs 19 extending from the upper side of the spring ears 17 are to facilitate the positioning or removal of the supply spool, and the spring 20 located in the chamber 6 provides enough tension upon the supply spool to prohibit unrolling of the film except upon winding by the key. The usual rollers 21 at each end of the frame 12 are provided to facilitate the movement of the film from the supply spool to the take-up roll and to help eliminate any scratching thereof. At the opposite end of the frame 12 are located two opposed film spool supports 22 and 23 for the take-up spool 24. The support 22 is identical to the supports 17, being provided with a rounded over lug 19 and a spool center 18. The spool support 23, however, is provided with a winding key 25 which cooperates with the winding key 3 of the back 1 to wind the take-up spool 24. In the end of this spool chamber 7 are two pins 26 which cooperate with the plate 11 of the back 1 in locking the two parts together.

The plate 11, as shown in Figure 4 and Figure 5, is provided with two slots 27 which coincide with the slots 28 of the plate 29 and the pins 26 of the body 2. The slots 27, however, have projecting lugs 30, which, when in position, prohibit the pins 26 from being removed from said slots. These lugs 30 are located in this locking position by sliding the plate 11 laterally with respect to the back 1. To permit and facilitate the sliding of the plate 11 it is provided with slots 31 to accommodate the pins 32, a spring clip 33 which forms a snap connection with the apertures 34, and a bent over lug 35 which is attached to the winding key. The pins 32 are provided to locate the plate 11 with respect to the back 1 and the slots 31 permit the lateral movement required to lock or unlock the pins 26 in the slots 27 and 28. The spring clip 33 forms a pimple and dimple connection with one of the apertures 34 in the plate 11, thereby retaining said plate in either of the two positions, and preventing any accidental movement that may unlock and remove the back except upon the intention of the operator. The bent over lug 35 is provided with an aperture which forms a collar about the circular slot 36 in the winding key 3 so that the lateral movement of the plate 11 may be effected by a movement of said key 3 exterior of the back 1.

The winding key 3 is also adapted to make a positive connection with the winding key 25 which is supported on the body 2 by the spring support 23. To form this connection the winding key 3 is provided with a web 37 extending inwardly with respect to the camera, from the end of said key so that it may register with a slot 38 in the winding key 25 of the body 2 when said body 2 and back 1 are in a closed position, thereby permitting the locking of the two parts together and making a direct connection between the two winding keys upon a lateral movement given by the operator to the exterior of the winding key 3 so that it is delivered from the position shown in Figure 5 to that shown in Figures 4 and 6.

The body and back are separated, of course, to load the camera and after the take-up spool 24 has been placed in the supports 22 and 23, as in Figure 3 where it is supported by the key 25 and center 18. The body 2 and back 1 are put together by engaging the angular spool compartment sections over the supply spool and its supports 17 and rocking the two elements together until the two angular sections of the take-up spool compartment 7 join in a light tight joint to house the take-up spool 24. The pins 26 slide into the slots 27 and 28, whereupon the winding key 3 is pushed in the web 37 of the key 3 engaging the slot 38 of the supplemental key 25 to facilitate the winding of the film, and the plate 11 being moved laterally until the lugs 30 enclose the pins 26 in the slots 27 and 28, thereby locking the two camera parts together.

The winding key 25 of the body 2 is adapted to form a positive connection with the take-up spool to facilitate the winding of the film by the provision of a spindle 39 which has a web 40 positioned in the slit opening 41 of said spindle 39 and fastened there by a pin 42. This pinned web 40 not only makes a connection with the film spool, but also retains the winding key in its position on the spring support 23. The spindle 39 and the web 40 are adapted to be inserted into the usual winding key aperture in the end of the usual film spool.

Though the winding key 3 may be turned in either direction, the winding key 25 is provided with a one way clutch so that said key may be turned in one direction only, thereby eliminating the possibility of unwinding the film and jamming it in the camera. This clutch comprises a tapering slot 43, adjacent the spindle 39, having a ball or roller 44 therein, pressed by a spring 45 into the point of said slot so that upon turning the spindle 39 in one direction the ball or roller 44 will be pressed into the point of the slot, thereby freezing and prohibiting further movement in that direction. When the spindle 39 is turned in the opposite direction, however, the ball or roller 44 will be pressed against the spring 25 into the open end of the slot 43, thereby allowing free movement of said spindle. The advantages of having this one-way clutch system on the winding key 25 are quite evident as the backing paper and film will be kept at a tension whether the camera is open or closed.

This locking of the camera parts together by means of a winding mechanism conserves parts and also the movements required of the operator in closing the camera and starting the feed of his film.

Having thus described my invention I claim and wish to secure by Letters Patent:

1. In a roll holding camera, the combination with a body portion, of a removable back adapted to cooperate therewith, a latch for holding the back on the body of the camera, a winding key carried by the camera and being directly connected to the latch, whereby the latch may be operated by the winding key.

2. In a roll holding camera, the combination with a body portion, of a removable back adapted to cooperate therewith, a winding key carried by said back, a latch for holding the back on the body portion of the camera, a winding key carried by said body and adapted to cooperate with the winding key of the back, said winding key of the back being directly connected to the latch, whereby the latch may be operated by the winding key.

3. In a roll holding camera, the combination with a body portion provided with a winding key adapted to rotate in one direction only, of a removable back adapted to cooperate therewith and carrying a winding key adapted to cooperate with the winding key of the body portion, a latch for holding the back to the body of the camera, said winding key of the back being directly connected to the latch, whereby the latch may be operated by the winding key.

4. In a roll holding camera, the combination with a body portion having a winding key thereon, the movement of said key being restricted to one direction only, of a removable back adapted to cooperate therewith, a latch for holding the back on the body of the camera, a winding key carried by the back of the camera adapted to cooperate with the key on the body and being directly connected to the latch, whereby the latch may be operated by the winding key, said latch limiting the lateral movement of said winding key.

5. A roll holding camera comprising two major separable parts, a winding key on each of said parts adapted to cooperate with each other and a latch for holding said parts together.

6. A roll holding camera comprising two major separable parts, a winding key on each of said parts adapted to cooperate with each other, a latch for holding said parts together being directly connected to one of said winding keys, whereby said latch may be operated by said winding key.

7. A roll holding camera comprising two major separable parts, a winding key carried by each of said parts and adapted to cooperate with each other, one of said winding keys being restricted in movement to one direction only, and a latch for holding the two parts together.

8. A roll holding camera comprising two major separable parts, a winding key carried by each of said parts and adapted to cooperate with each other, one of said winding keys being restricted in movement to one direction only, and a latch for holding the two parts together, said latch being directly connected to one of said winding keys, whereby said latch may be operated by said winding key.

9. A roll holding camera comprising two major separable parts, adapted to cooperate with each other, a latch for holding said parts together, a winding key carried by each of said parts, one of said winding keys having a lateral movement with respect to said part whereby it is adapted to slide into direct connection with the other winding key.

10. A roll holding camera comprising two major separable parts, a latch for holding said parts together, a winding key supported by each of said parts and adapted to cooperate with each other, one of said winding keys being restricted in movement to one direction only, the other of said winding keys being adapted to slide laterally and also being directly connected to said latch, whereby the latch may be operated by the winding key.

11. A roll holding camera comprising two major separable parts, a latch for holding said parts together, a winding key carried by said camera and being directly connected to the latch, whereby the latch may be operated by the winding key.

12. In a roll holding camera, the combination with a body portion having film spool supports at opposite sides thereof, of a removable back adapted to coperate therewith, a latch for holding the back on to the body portion, a winding key mounted on one of said film spool supports, another winding key mounted on the removable back and adapted to cooperate with the first mentioned winding key, said second mentioned winding key being directly connected to the latch, whereby said latch may be operated by said winding key.

13. In a roll holding camera, the combination with a body portion having film spool supports at opposite sides thereof, of a removable back adapted to cooperate therewith, a latch for holding said back on to said body, a winding key mounted on one of said film spool supports adapted to be rotated in one direction only, another winding key mounted on the removable back adapted to cooperate with the first mentioned winding key, said second mentioned winding key having a lateral movement and being directly connected to said latch, whereby the latch may be operated by the winding key.

Signed at Rochester, New York, this 8th day of July, 1930.

CARL C. FUERST.